US 6,691,018 B1

(12) United States Patent
Miyahara

(10) Patent No.: US 6,691,018 B1
(45) Date of Patent: Feb. 10, 2004

(54) METHOD AND SYSTEM FOR IDENTIFYING A LANE CHANGE

(75) Inventor: Shunji Miyahara, Yokohama (JP)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/301,287

(22) Filed: Nov. 21, 2002

(51) Int. Cl.$^7$ ............................. B60T 8/32; G01S 13/04
(52) U.S. Cl. ..................... 701/96; 701/117; 701/301; 340/435
(58) Field of Search ........................ 701/1, 93, 301, 701/117, 96; 340/435, 903

(56) References Cited

U.S. PATENT DOCUMENTS

| | | | |
|---|---|---|---|
| 5,459,283 A | 10/1995 | Birdwell, Jr. ................. 84/737 |
| 5,929,802 A | 7/1999 | Russell et al. ................. 342/70 |
| 5,964,822 A | 10/1999 | Alland et al. ................. 701/301 |
| 5,977,906 A * | 11/1999 | Ameen et al. ................. 342/174 |
| 6,085,151 A * | 7/2000 | Farmer et al. ................. 701/301 |
| 6,107,956 A | 8/2000 | Russell et al. ................. 342/70 |
| 6,202,027 B1 | 3/2001 | Alland et al. ................. 701/301 |
| 6,230,093 B1 | 5/2001 | Michi et al. ................... 701/96 |
| 6,259,985 B1 | 7/2001 | Sielagoski et al. ............. 701/96 |
| 6,301,542 B1 | 10/2001 | Kirchberger et al. .......... 701/93 |
| 6,304,811 B1 | 10/2001 | Prestl ........................... 701/96 |
| 6,311,123 B1 | 10/2001 | Nakamura et al. ............. 701/96 |
| 6,317,679 B2 | 11/2001 | Sielagoski et al. ............. 701/96 |
| 6,348,889 B1 | 2/2002 | Ashihara et al. ............... 342/70 |
| 6,363,311 B1 * | 3/2002 | Kuroda et al. ................. 701/96 |
| 6,420,997 B1 * | 7/2002 | Cong ............................ 342/70 |
| 2002/0016663 A1 | 2/2002 | Nakamura et al. ............. 701/96 |
| 2002/0032515 A1 | 3/2002 | Nakamura et al. ............. 701/96 |

* cited by examiner

*Primary Examiner*—Ronnie Mancho
(74) *Attorney, Agent, or Firm*—Brinks Hofer Gilson & Lione

(57) ABSTRACT

A method for determining whether a target vehicle is changing lanes in a roadway is disclosed. The method includes measuring an azimuth angle and a range between the target vehicle and a host vehicle, measuring a host vehicle velocity and a host vehicle yaw rate, calculating a relative velocity from the measured azimuth angle, range, host vehicle velocity and host vehicle yaw rate, comparing an absolute value of the calculated relative velocity and azimuth angle to a developed theoretical equation, and determining whether the target vehicle is changing lanes based on the comparison of the absolute value of the calculated relative velocity and azimuth angle to the developed theoretical equation over time.

16 Claims, 8 Drawing Sheets

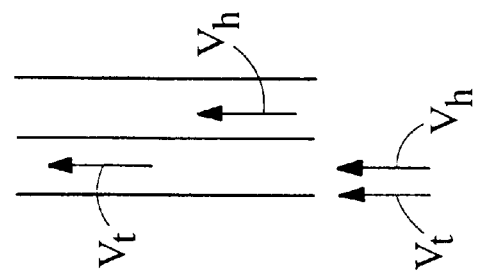
Fig. 6d
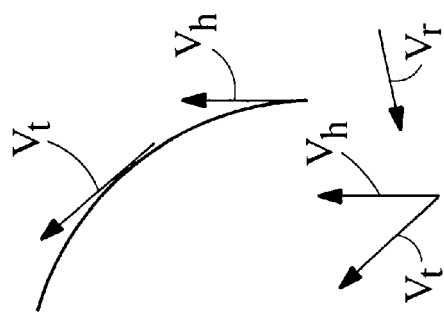
Fig. 6c
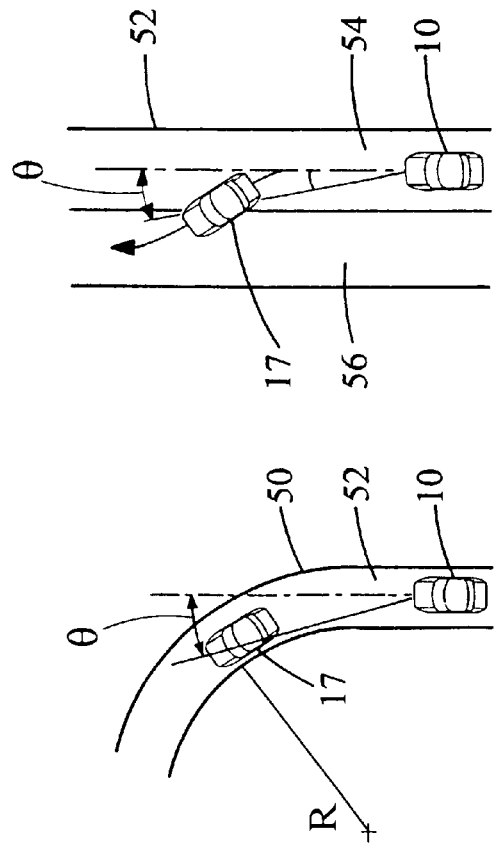
Fig. 6b
Fig. 6a

METHOD AND SYSTEM FOR IDENTIFYING A LANE CHANGE

CROSS-REFERENCE TO RELATED APPLICATIONS

The present invention is related to U.S. Ser. No. 10/153,026, filed on May 21, 2002, entitled "Target Vehicle Identification Based on the Theoretical Relationship Between the Azimuth Angle and Relative Velocity."

TECHNICAL FIELD

The present invention relates to adaptive cruise control (ACC) systems where a vehicle equipped with an ACC system tracks a target vehicle and determines whether the target vehicle has changed lanes.

BACKGROUND

Conventionally, a vehicle having an ACC system follows a preceding vehicle (target vehicle) at a constant distance or headway time. Typically, steering or yaw rate sensor information is used to estimate target vehicle distance and speed if both the target vehicle and the ACC equipped vehicle are in the same straight lane or curved lane. However, when the preceding or target vehicle is changing lanes, an ACC equipped vehicle having a system that relies on steering or yaw rate information will not be able to accurately determine whether the preceding vehicle is changing lanes or whether the preceding vehicle is entering/exiting a curve.

A prior art method for estimating the path of a preceding or target vehicle is disclosed and described in Japanese unexamined patent application No. 4-245600. In the application, the path estimation was determined based on the steering and yaw rate information. However, the estimation of the application is only accurate when an ACC equipped vehicle and the target vehicle are in the same curve or on a straight line. More specifically, if one of the vehicles (ACC equipped or target vehicle) is in a lane having a different radius of curvature, the application's path estimation method is inaccurate.

Therefore, what is needed is a new and improved system and method for determining whether a preceding or target vehicle is changing lanes. The new and improved method of the present invention should determine whether the preceding vehicle is changing lanes during a transient period, where the lane change occurs or when both vehicles are in different parts of the curve having different curvatures.

SUMMARY

In an aspect of the present invention a method for determining whether a target vehicle is changing lanes in a roadway is provided. The method includes measuring an azimuth angle and a range between the target vehicle and a host vehicle, measuring a host vehicle velocity and a host vehicle yaw rate, calculating a relative velocity from the measured azimuth angle, range, host vehicle velocity and host vehicle yaw rate, comparing an absolute value of the calculated relative velocity and azimuth angle to a developed theoretical equation, and determining whether the target vehicle is changing lanes based on the comparison of the absolute value of the calculated relative velocity and azimuth angle to the developed theoretical equation over time.

In another aspect of the present invention, the developed theoretical equation is an equation of an ellipse.

In yet another aspect of the present invention, the developed theoretical equation is a quadratic equation.

In yet another aspect of the present invention the equation of the ellipse describes the relationship between the azimuth angle and relative velocity during a lane change.

In still another aspect of the present invention, comparing an absolute value of the calculated relative velocity and azimuth angle to a developed theoretical equation further includes performing a regression on the calculated relative velocity and measured azimuth angle.

In still another aspect of the present invention determining whether the target vehicle is changing lanes further includes calculating a standard deviation indicating how well the developed theoretical equation fits the measured azimuth angle and calculated relative velocity.

These and other aspects and advantages of the present invention will become apparent upon reading the following detailed description of the invention in combination with the accompanying drawings.

BRIEF DESCRIPTION OF THE FIGURES

FIGS. 6a, 6b, 6c and 6d are diagrams illustrating the host and the target vehicles traveling along a road, wherein the target vehicle changes lanes;

DETAILED DESCRIPTION

Figure 1:
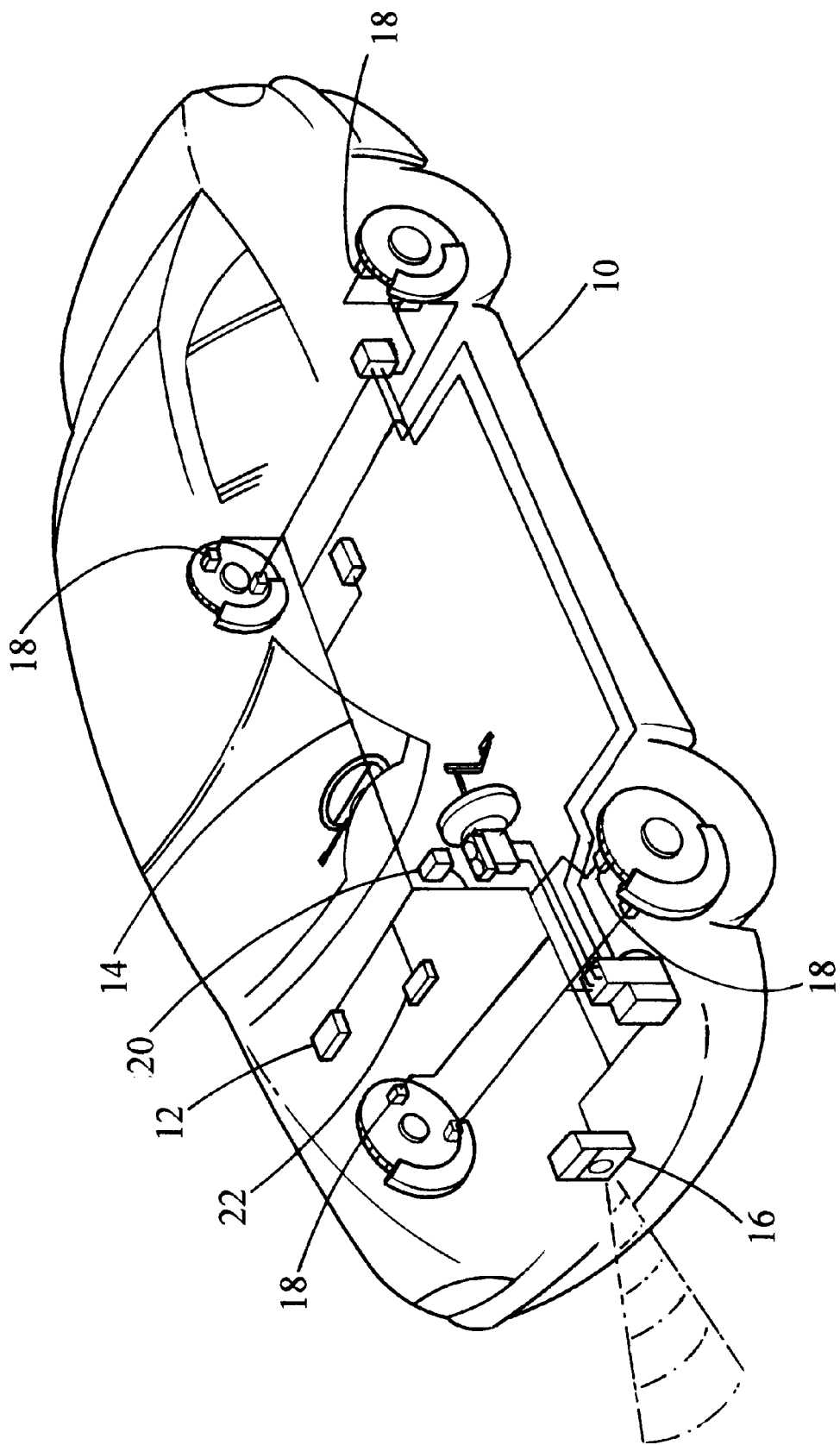
FIG. 1 is a perspective view of a host vehicle equipped with an adaptive cruise control (ACC) system, in accordance with the present invention.

Referring now to FIG. 1, a perspective view of a host vehicle 10 having an adaptive cruise control (ACC) system is illustrated, in accordance with the present invention. Host vehicle 10 generally includes an ACC control module 12 coupled to a communication network 14, such as a controller area network (CAN) network. Control module 12 typically has an electronic memory coupled to a processor for storing and executing ACC program code. Generally, control module 12 of the ACC system receives signals from various sensors, including a radar sensor 16 or other proximity sensor for determining an azimuth angle (θ) and an absolute value ($V_{abs}$) of a relative velocity ($V_r$) between the host vehicle 10 and a target (preceding) vehicle 17 (shown in FIG. 2). Further, a plurality of wheel speed sensors 18 provide signals indicative of the host vehicle's wheel speed to network 14.

Other sensors in communication with network 14 are provided such as a steering wheel angle sensor 20 for measuring the steering wheel angle, and a yaw rate sensor 22 for measuring the yaw rate of host vehicle 10. The information derived for the above mentioned sensors will be utilized in a control algorithm or method for determining the target vehicle's location, as will be described in more detail below.

Figure 2:
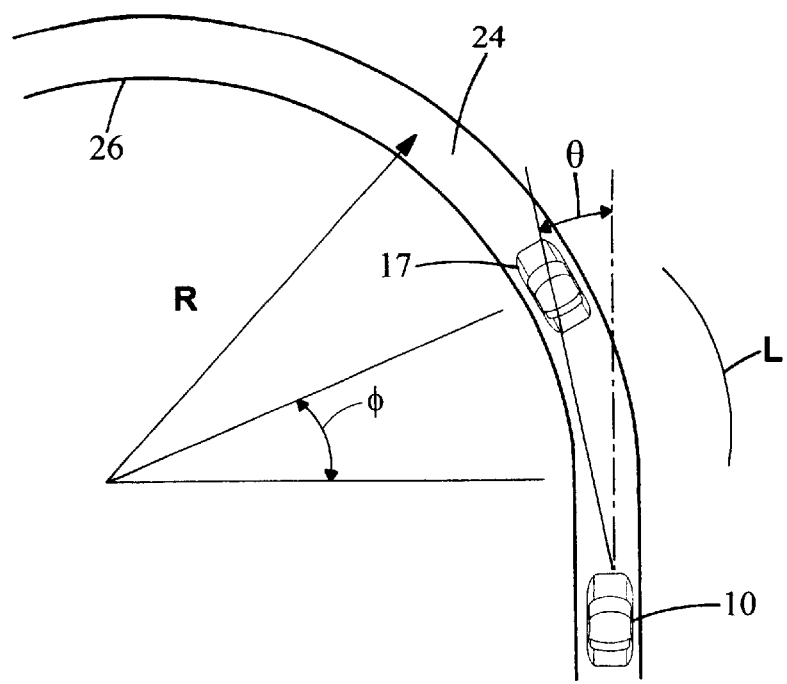
FIG. 2 is a plan view of a host vehicle tracking a target vehicle through a curve in a roadway, in accordance with the present invention.

Referring now to FIG. 2, a host vehicle 10 equipped with an ACC system is shown following or tracking target vehicle 17 through a curve 24, in accordance with the present invention. Typically, curve 24 in a roadway 26 will have a radius of curvature "R". The location of target vehicle 17 along curve 24 is described by the radius of curvature "R" and an angle θ. The angle θ represents the angle between the entrance of curve 24 and the current location of target vehicle 17.

Figure 3:
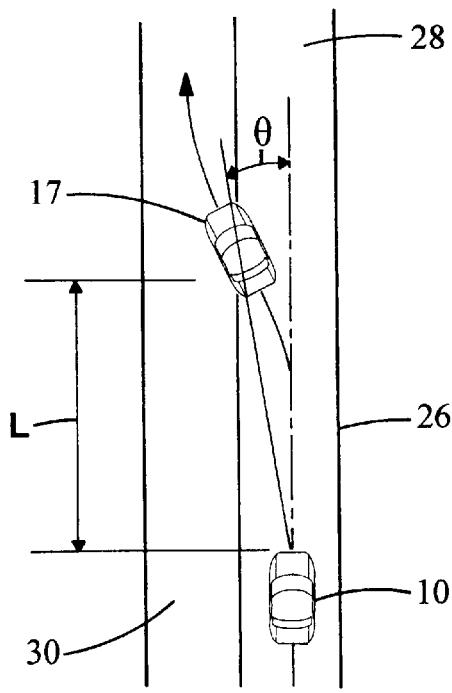
FIG. 3 is a plan view of a host vehicle tracking a target vehicle, wherein the target vehicle is changing lanes, in accordance with the present invention.

A method of the present invention determines whether target vehicle 17 is changing lanes. As shown in FIG. 3, roadway 26 includes two lanes 28 and 30, and as illustrated, target vehicle 17 is moving from lane 28 to lane 30 while the host vehicle 10 remains in lane 28. Prior art methods have not been able to accurately determine whether target vehicle 17 is changing lanes (i.e. from lane 28 to lane 30) or is entering curve 24 in a roadway 26. This invention also determines whether the preceding vehicle is changing lanes from lane 30 to lane 28.

Figure 4:
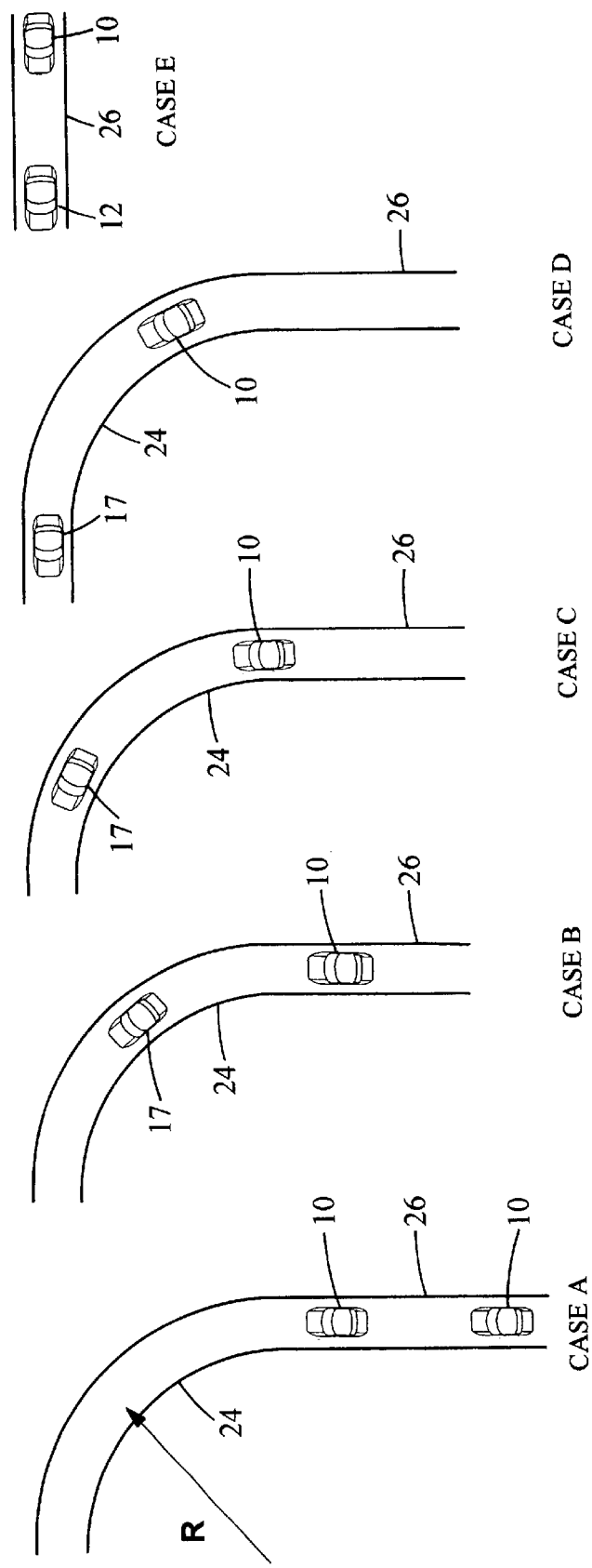
FIG. 4 is a plan view illustrating the host vehicle and target vehicle through a curve in a roadway.

More specifically, there are five cases, as illustrated in FIG. 4, that describe the transitional scenarios of host vehicle 10 and target vehicle 17 traveling through curve 24 in roadway 26. Of these five cases, case A (where the target vehicle 17 and host vehicle 10 have not entered curve 24) and case E (where the target vehicle 17 and the host vehicle 10 have exited curve 24), pose no significant problem in identifying the location of target vehicle 17. Similarly, case C is easily identifiable by estimating the radius of curvature "R" of curve 24 using yaw rate and/or steering wheel angle information of host vehicle 10 (as known in the art) and identifying whether target vehicle 17 is in the same lane as the host vehicle. However, prior art methods have not been able to identify the location of the target vehicle 17 in cases B and D, because yaw rate and/or steering wheel angle information is not sufficient to determine the lane location of target vehicle 17 in these transitional scenarios.

Figure 5C:
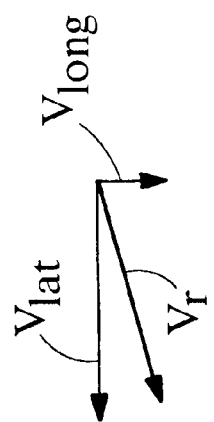
FIGS. 5a–5c are vector diagrams illustrating the relative velocity (Vr) between the target and host vehicle and the lateral and longitudinal components of the relative velocity.
Figure 5B:
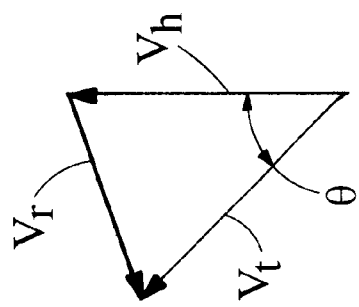
Figure 5A:
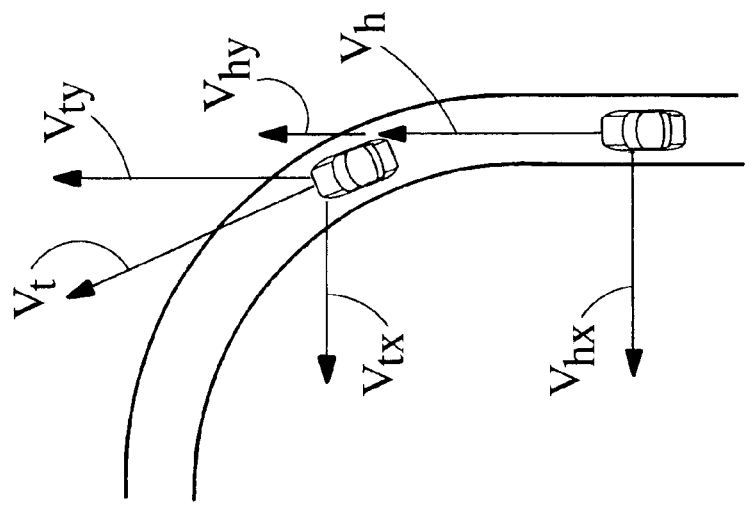

With reference to FIGS. 5a–5c the relative velocity ($V_r$) between target 17 and host vehicles 10 is illustrated. $V_r$ is calculated by considering the velocity vector of the host vehicle ($V_h$) and the velocity vector of the target vehicle ($V_t$). More specifically, the following equation is used to calculate the absolute value of the relative velocity ($V_r$):

$$V_{abs} = SQRT[(V_{tx}-V_{hx})^2 + (V_{ty}-V_{hy})^2] \quad (1)$$

Where: $V_{tx}$=the x component of velocity Vt;
$V_{ty}$=the y component of velocity Vt;
$V_{hx}$=the x component of velocity Vh; and
$V_{hy}$=the y component of velocity Vh.

After the relative velocity is calculated the lateral ($V_{lat}$) and longitudinal ($V_{long}$) components of the relative velocity may be obtained by applying well know geometry and trigonometry principles. The longitudinal direction $V_{long}$ corresponds to the direction of host vehicle 10. The azimuth angle θ, as previously mentioned, is measured using radar sensor 16. The present invention uses the absolute value ($V_{abs}$) of the relative velocity ($V_r$) as the relative velocity. The lateral component of the relative velocity can be used in place of the absolute value.

Figure 7:
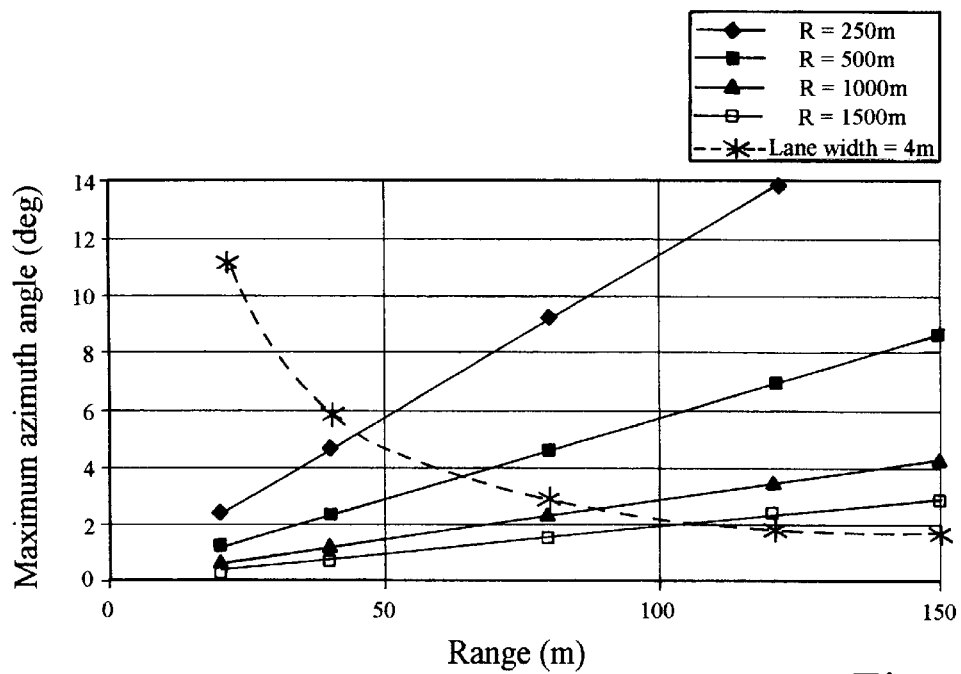
FIG. 7 is a chart illustrating the relationship between radius of curvature of a roadway and range between the target and host vehicle and azimuth angle.

With reference to FIGS. 6a, 6b, 6c, and 6d, host vehicle 10 is shown tracking target vehicle 17 through a curve 50 and during a lane change. As shown in FIGS. 6a and 6b, azimuth angle θ may be used to detect when target vehicle 17 is entering a curve 50 in the roadway 52 or changing lanes from a first lane 54 to a second lane 56 in roadway 52. However, the use of the azimuth angle θ alone is not adequate to distinguish curve-entry from lane change, since the degree of change of the angle θ depends on the radius and/or the range, as shown in FIG. 7. More specifically, as radius (R) describing the curvature of roadway 52 and range increases so does the maximum azimuth angle θ.

Thus, the present invention utilizes the absolute value of the relative velocity vector ($V_r$) in conjunction with azimuth angle θ to distinguish between curve-entry/exit and lane change. The $V_t$ representing the velocity vector of target vehicle 17 and $V_h$ representing the velocity vector of host vehicle 10 are shown in FIGS. 6c and 6d and are clearly different for curve-entry as compared to lane change. However, the use of vectors $V_t$, and $V_h$ alone would not be sufficient to distinguish a lane change from no-lane change, as seen from FIG. 6d. Accordingly, the combination of azimuth angle θ and relative velocity vectors $V_t$ and $V_h$ are utilized for distinguishing between curve-entry and lane change.

Figure 8:
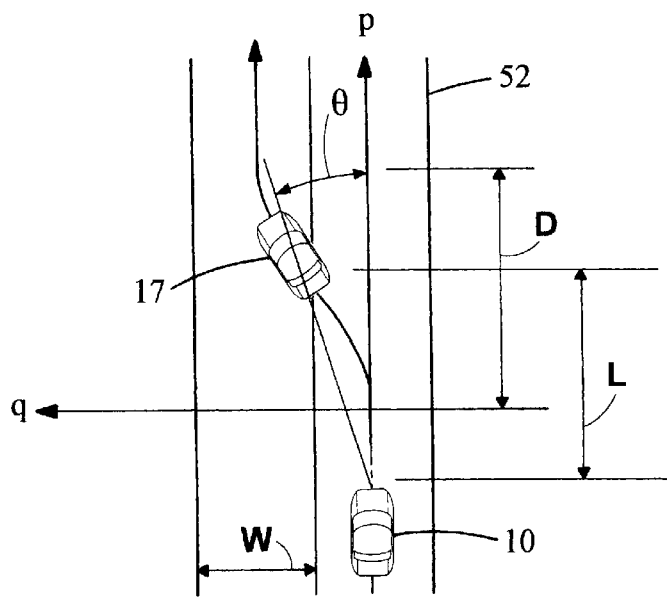
FIG. 8 is a diagram illustrating the host and the target vehicles traveling along a road and further illustrating the geometric relationship between the target and host vehicles.
Figure 9:
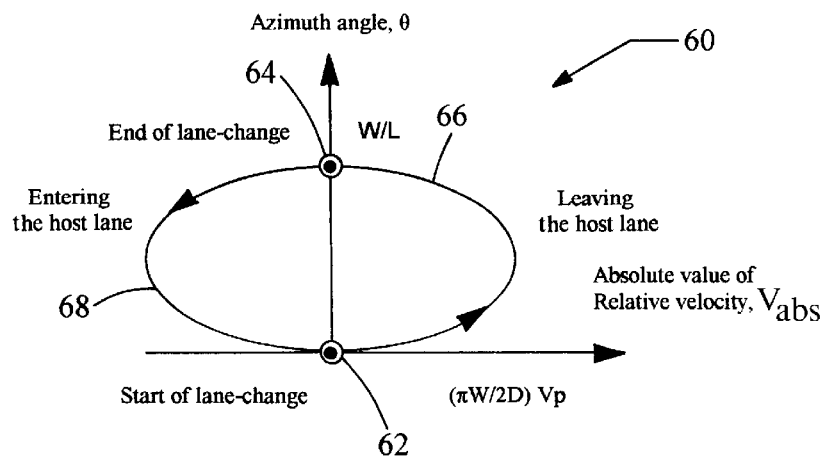
FIG. 9 is a phase chart illustrating the relationship between azimuth angle and relative velocity while the host and the target vehicles are in the same lane and when the target vehicle changes lanes.

With reference to FIGS. 8 and 9, the mathematical relationship describing the position of target vehicle 17 along roadway 52 during the lane change can be approximated by:

$$q = (W/2)\{1 - \cos(\pi p/D)\} \; 0 < p < D \quad (2)$$

Assuming that the velocities of target vehicle 17 and host vehicle 10 along the longitudinal direction are the same and that azimuth angle θ is small, the equation (2) is maybe expressed as:

$$\{(\theta - (W/2L))/(W/2L)\}^2 + \{(V_{abs}/Vp)/(\pi W/2D)\}^2 = 1 \quad (3)$$

where:
W=width of lane;
L=the range;
D=the length for the lane change;
$V_{abs}$=the absolute value of the relative velocity; and
Vp=the velocity of the host and target vehicles.
Equation (3) is derived as follows:
The velocity of ACC and target vehicle is expressed in Cartesian coordinates.

$$V_h = (Vp, 0)(m/s) \; Vp > 0 \quad (4)$$

$$V_t = (Vp, Vq(p))(m/s) \quad (5)$$

The first and second components of the velocity correspond to the longitudinal and the lateral velocities.

The distance between the vehicles along a p-direction is L (m). The lane-change distance is:

$$D(m) (= Vp * 4 \sim 8 \text{ sec}). \quad (6)$$

The trace of the target during the lane-change is assumed as follows:

$$q=(W/2)\{1-\cos(\pi p/D)\} 0<p<D \qquad (7)$$

The azimuth angle is given by Eq.(8).

$$\tan\theta=q/L=(W/2L)\{1-\cos(\pi p/D)\} \qquad (8)$$

The q-component of the target velocity is given by Eq. (9).

$$Vq(p)=Vp*(dq/dp)=Vp*(\pi W/2D)\sin(\pi p/D) \qquad (9)$$

The relative velocity is:

$$Vr=V_t-V_h=(0, Vq(p)) \qquad (10)$$

The absolute value of the relative velocity is:

$$V_{abs}=|Vq(p)|=Vp(\pi W/2D)|\sin(\pi p/D)| \qquad (11)$$

The relationship between the azimuth angle and relative velocity is given by Eq. (8) and (11) and is shown in Eq. (12).

$$\{(\tan\theta-(W/2L))/(W/2L)\}^2+\{(V/Vp)/(\pi W/2D)\}^2=1 \qquad (12)$$

The azimuth angle $\theta$ is assumed to be small enough.

$$\{(\theta-(W/2L))/(W/2L)\}^2+\{(V/Vp)/(\pi W/2D)\}^2=1 \qquad (13)$$

Thus, equation (13) describes an ellipse.

The phase chart 60 of azimuth angle $\theta$ versus absolute value ($V_{abs}$) of the relative velocity corresponding to target vehicle 17 changing lanes is shown in FIG. 9. In chart 60, the stationary conditions (no change in relative velocity vectors) where both vehicles are running straight, in the same or different lanes, are indicated by a first point 62 and a second point 64, and the transient conditions, where the target vehicle is changing lanes, are represented by a first elliptical curve 66 and a second elliptical curve 68. Here 66 and 68 are the same since the absolute value of the relative velocity is used as horizontal axis. If target vehicle 17 turns left or right, azimuth angle $\theta$ becomes positive or negative. FIG. 9 illustrates only the scenario where target vehicle 17 is turning left. First elliptical curve 66 from point 62 to point 64 represents target vehicle leaving the host vehicle lane and elliptical curve 68 from point 64 to point 62 represents target vehicle entering the host vehicle lane.

Figure 10:
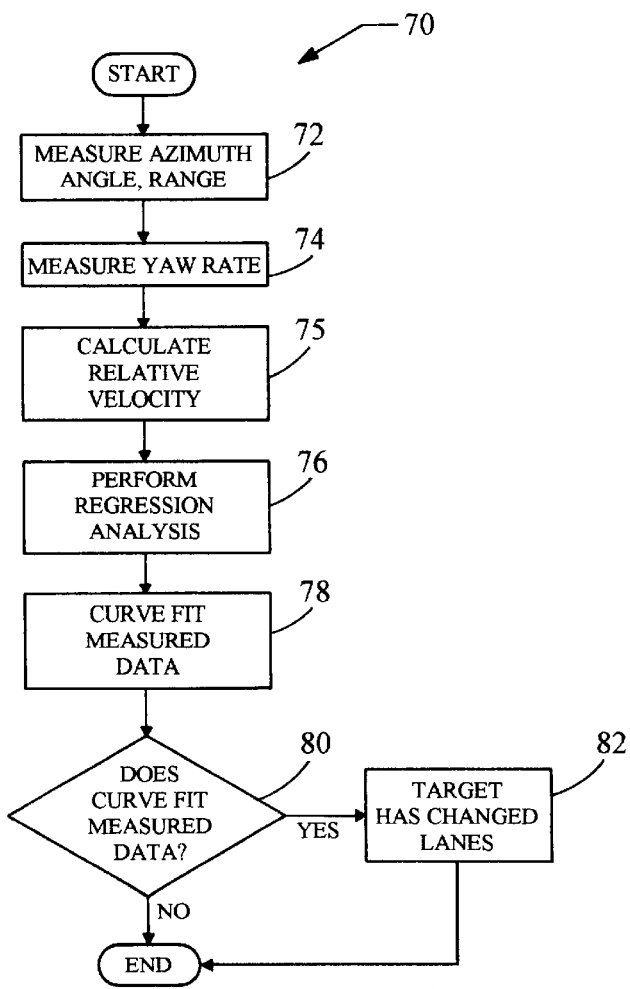
FIG. 10 is a flowchart illustrating a method for determining whether target vehicle is changing lanes.

With reference to FIG. 10, a method 70 for determining whether target vehicle 17 is changing lanes is provided, in accordance with the present invention. Method 70 utilizes the ACC information, such as steering angle/yaw-rate of the host vehicle, relative velocity and the azimuth angle of target (preceding) vehicle 17 against the bore-sight of the ACC. The method is based on a quasi time-independent phase-chart between: Azimuth angle $\theta$ of the preceding vehicle 17 against the bore-sight of the host vehicle and the absolute value $V_{abs}$ of the relative velocity of the vehicle against host vehicle 10.

Figure 11:
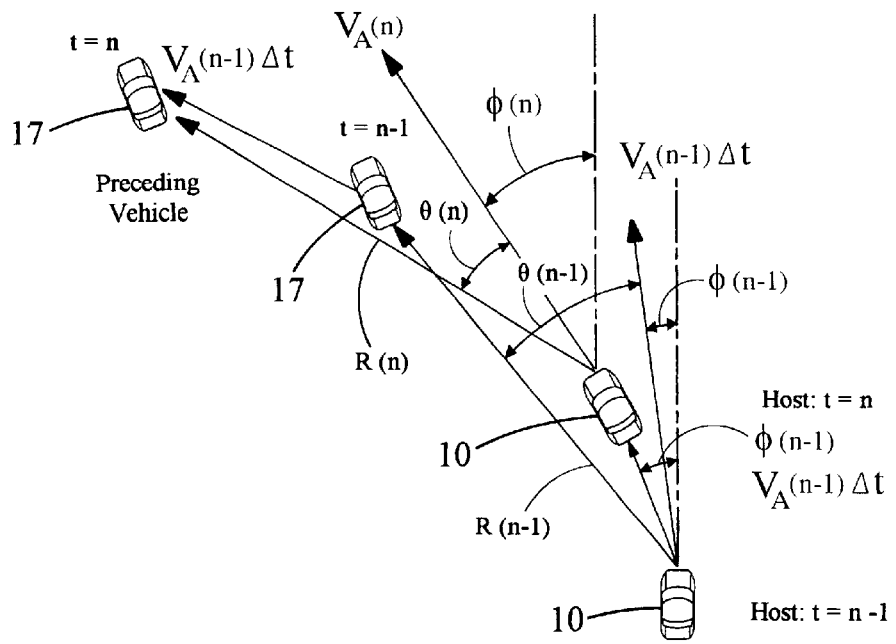
FIG. 11 is a diagram illustrating relative movement of the target and host vehicles over time, $V_A$, $V_p$, R, $\theta$ and $\phi$ are velocity vectors of host and preceding vehicles, vector from host to preceding vectors, azimuth angle measured by radar and direction of host vehicle, respectively.

The method 70 of the present invention includes measuring azimuth angle$\theta$, range L, and yaw rate, as represented by blocks 72 and 74. Next the relative velocity $V_r$ is calculated as shown in FIG. 11. The position of host vehicle 10 is calculated from the velocity and direction of host vehicle 10. The direction is calculated by the integration of the yaw rate. The position of the preceding vehicle 17 is determined from the position of the host vehicle 10, the range and azimuth angle. The velocity of host 10 and preceding 17 vehicles is the time-change of the positions of the vehicles. The difference between the velocities is the relative velocity $V_r$, as described below in equations (14) through (16).

$$V_h(n-1)^*=(V_h(n-1)+V_h(n))/2 \qquad (14)$$

$$V_t(n-1)^*=(R(n)+V_h(n-1)^*\Delta t-R(n-1))/\Delta t \qquad (15)$$

$$V_r(n-1)=V_t(n-1)^*-V_h(n-1)^* \qquad (16)$$

where:
  $V_h$=Average velocity of Host
  $V_t^*$=Average velocity of target or preceding vehicle
  $V_r$=Relative velocity.

Figure 12:
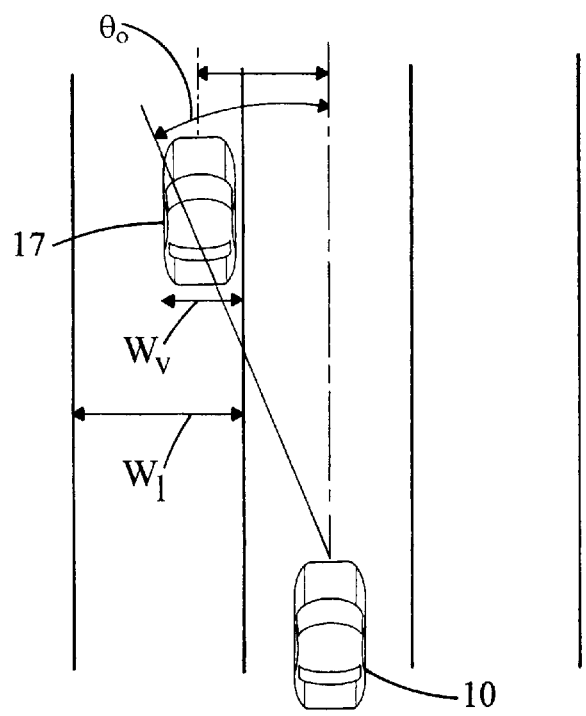
FIG. 12 is a diagram illustrating an azimuth angle limit of the target vehicle with respect to the host vehicle, in accordance with the present invention.

The absolute value $V_{abs}$ of the calculated relative velocity $V_r$ and azimuth angle $\theta$ over time t, represented by the following series $(V_{abs}(\tau), \theta(\tau))$, $\tau=t-n, t-n+1, \ldots,t)$. If the range of the azimuth angle is, for a short period, greater than half of the azimuth angle limit $\theta_0$ shown FIG. 12, the following regression will be started. The limit $\theta_0$ corresponds to the angle where preceding vehicle 17 is just out of the lane as shown in FIG. 12. Of course, the limit $\theta_0$ depends on the range, preset lane width Wv, preset vehicle width Wv and the curvature of the road on which host vehicle 10 exists.

Further, a regression analysis is performed, as represented by blocks 76 and 78, using the equation for an ellipse to curve fit the data (azimuth angle and absolute value of the relative velocity over time). By determining how well the regression curve (the ellipse) fits the measured data, it is determined whether target vehicle 17 is undergoing a lane change, as represented by blocks 80 and 82. One advantage of using this method is that a great deal of experimental data for determining the criteria is not required since the algorithm uses a theoretical relationship, not empirical data.

The equation of the ellipse (equation (3) above) used in the regression analysis at bock 76, is converted to the following quadratic equation to simplify solving for the regression coefficients $a_1$, and $a_2$:

$$Z=Y^2=a_1X+a_2X^2 \qquad (17)$$

Where:
  Y=relative velocity;
  X=azimuth angle;
  $a_1$=first linear and quadratic coefficients of the regression; and
  $a_2$=second linear and quadratic coefficients of the regression.

By applying $(\theta(\tau), V_{abs}(\tau)^2)$, k=t-n, t-n+1, $\ldots$ ,t to (X,Z), the estimated value $a_2^*$ and standard deviation $\sigma_{a2}$ of the coefficient $a_2$ are calculated. If Eqs.(18 and 19) below are satisfied, then the method of the present invention determines that the target vehicle is changing lanes.

$$\sigma_z/\mu_z < c_z \qquad (18)$$

$$\left|\frac{W^*}{W^* - \text{Width\_lane}}\right| < c_{lane} \qquad (19)$$

$$W^* = -4La_2^*/a_1^* \qquad (20)$$

where:
  $\sigma_z$=standard deviation;
  $\mu_z$=average of Z;
  $W^*$=the estimated lane width;
  Width_lane=the measured range;
  L=preset lane width;

$a_1^*$ = the first regression coefficient;

$a_2^*$ = the second regression coefficient;

$c_z$ = criteria; and $c_{lane}$ = criteria.

Criteria $c_z$ and $c_{lane}$ are predefined constants that are established and may be adjusted to achieve certain system performance goals. Typically, $c_z$ and $c_{lane}$ have values in the range of 0.1 to 0.2 and the range 0.25 to 0.5, respectively. Those criteria are determined through the test driving. The lane width ranges from 3.25 to 4.0 (in meters) in Japan and US. Therefore, the estimated lane width $W^*$ should range around that. ($W^*$ is calculated from Eq.(20)).

Accordingly, the present invention has many advantages and benefits over the prior art methods for determining target vehicle location on a roadway. For example, the method or algorithm of the present invention is able to distinguish between target vehicle lane changes and target vehicle entrance into or exit from a curve. Thus, the present invention is a dramatic improvement over prior art methods that utilize yaw rate and other vehicle parameters to determine target vehicle location in a roadway.

As any person skilled in the art of adaptive cruise control (ACC) systems will recognize from the previous detailed description and from the figures and claims, modifications and changes can be made to the preferred embodiments of the invention without departing from the scope of this invention defined in the following claims.

What is claimed is:

1. A method for determining whether a target vehicle has changed lanes in a roadway, the method comprising:

measuring an azimuth angle and a range between the target vehicle and a host vehicle;

measuring a host vehicle velocity and a host vehicle yaw rate;

calculating a relative velocity from the measured azimuth angle, range, host vehicle velocity and host vehicle yaw rate;

comparing an absolute value of the calculated relative velocity and azimuth angle to a developed theoretical equation; and determining whether the target vehicle is changing lanes based on the comparison of the absolute value of the calculated relative velocity and azimuth angle to the developed theoretical equation over time.

2. The method of claim 1 wherein the developed theoretical equation is an equation of an ellipse.

3. The method of claim 2 wherein the developed theoretical equation is a quadratic equation.

4. The method of claim 2 wherein the equation of the ellipse describes the relationship between the azimuth angle and relative velocity during a lane change.

5. The method of claim 1 wherein comparing an absolute value of the calculated relative velocity and azimuth angle to a developed theoretical equation further comprises performing a linear regression on the calculated relative velocity and measured azimuth angle.

6. The method of claim 5 wherein determining whether the target vehicle is changing lanes further comprises calculating a standard deviation indicating how well the developed theoretical equation fits the measured azimuth angle and calculated relative velocity.

7. The method of claim 1 further comprising determining an azimuth angle limit before comparing an absolute value of the calculated relative velocity and azimuth angle to a developed theoretical equation.

8. The method of claim 1 further comprising determining whether the target vehicle is exiting or entering a lane the host vehicle is in by determining whether the measured azimuth angle has had a positive or a negative change in value.

9. The method of claim 8 wherein determining whether the target vehicle is exiting or entering a lane the host vehicle is in further comprises determining that the target vehicle is exiting the lane the host is in by determining that the measured azimuth angle has had a positive change in value.

10. The method of claim 8 wherein determining whether the target vehicle is exiting or entering a lane the host vehicle is in further comprises determining that the target vehicle is entering the lane the host vehicle is in by determining that the measured azimuth angle has had a negative change in value.

11. A method for determining whether a target vehicle has changed lanes in a roadway, the method comprising:

measuring an azimuth angle and a range between the target vehicle and a host vehicle;

measuring a host vehicle velocity and a host vehicle yaw rate;

calculating a relative velocity from the measured azimuth angle, range, host vehicle velocity and host vehicle yaw rate;

comparing an absolute value of the calculated relative velocity and azimuth angle to an equation of an ellipse; and determining whether the target vehicle is changing lanes based on the comparison of the absolute value of the calculated relative velocity and azimuth angle to the equation of an ellipse over time.

12. The method of claim 11 further comprising converting the equation of an ellipse is to a quadratic equation.

13. The method of claim 11 wherein the equation of the ellipse describes the relationship between the azimuth angle and relative velocity during a lane change.

14. The method of claim 11 wherein comparing an absolute value of the calculated relative velocity and azimuth angle to the equation of an ellipse further comprises performing a linear regression on the calculated relative velocity and measured azimuth angle.

15. The method of claim 14 wherein determining whether the target vehicle is changing lanes further comprises calculating a standard deviation indicating how well the equation of an ellipse fits the measured azimuth angle and calculated relative velocity.

16. The method of claim 11 further comprising determining an azimuth angle limit before comparing an absolute value of the calculated relative velocity and azimuth angle to the equation of an ellipse.

* * * * *